United States Patent
Schulz et al.

(10) Patent No.: US 6,516,073 B1
(45) Date of Patent: Feb. 4, 2003

(54) SELF-POWERED MEDICAL DEVICE

(75) Inventors: Herve Schulz, Erlangen (DE); Tom Weidner, Nuremberg (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 33 days.

(21) Appl. No.: 09/655,961

(22) Filed: Sep. 5, 2000

(30) Foreign Application Priority Data

Sep. 2, 1999 (DE) .......................................... 199 41 859

(51) Int. Cl.$^7$ ............................................... H04R 25/00
(52) U.S. Cl. ........................ 381/312; 381/314; 381/320; 381/321
(58) Field of Search .................................. 381/23.1, 312, 381/314, 320, 321, 323, 71.8, 71.11, FOR 127, FOR 129, FOR 131

(56) References Cited

U.S. PATENT DOCUMENTS 6,128,392 A * 10/2000 Leysieffer et al. .......... 381/314

FOREIGN PATENT DOCUMENTS

DE 196 02 453 7/1997

OTHER PUBLICATIONS

"Battery Fail–Safe Mechanism For Personal Computer," IBM Technical Disclosure Bulletin, vol. 33, No. 10A, Mar. 1991 (pp. 440–442).

* cited by examiner

*Primary Examiner*—Huyen Le
(74) *Attorney, Agent, or Firm*—Schiff Hardin & Waite

(57) ABSTRACT

A self-powered medical device, which is operated independently of the public utility network, has at least one voltage source, a signal input for accepting an analog input signal and a signal processing unit. The sampling rate for the input signal or the clock frequency of at least one digital component can be varied. Therefore, the energy demand can be reduced according to the requirements of the signal processing or when the discharge state of the voltage source requires a reduction.

4 Claims, 1 Drawing Sheet

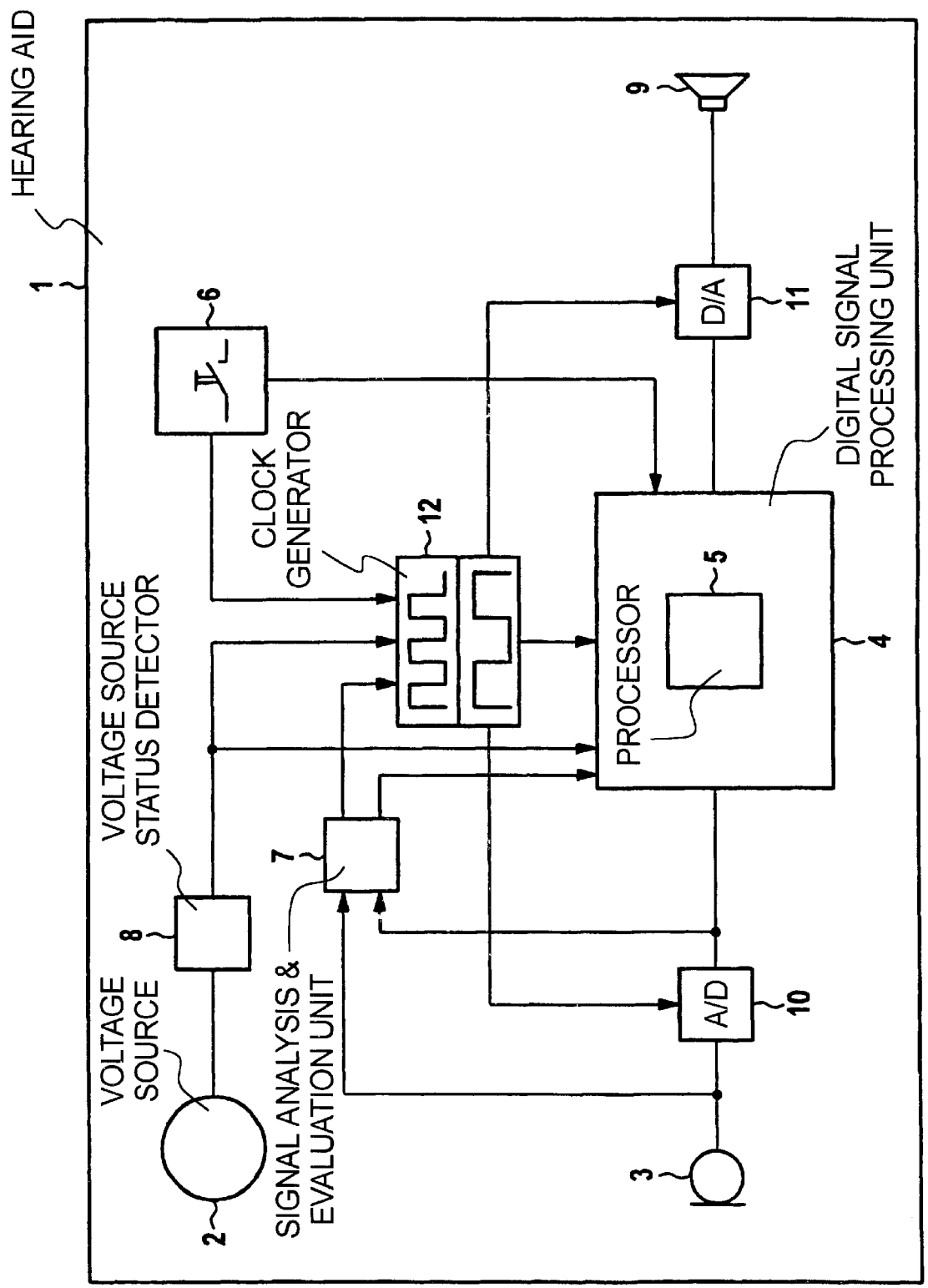

SELF-POWERED MEDICAL DEVICE

BACKGROUND OF THE INVENTION

1. Field of the Invention

The present invention relates to a medical device that can be operated independently of the public utility power network and that has at least one signal input for accepting an input signal and a signal processing unit.

2. Description of the Prior Art

Medical devices, which are operated independently of the public utility power network i.e., which are self-powered, and which are processor-controlled, are currently utilized in many areas of the medical diagnostics and therapy. Examples are electrocardiographs, blood pressure measuring devices, blood-sugar monitoring devices, cardiac pacemakers and hearing aid devices. Such a device generally has at least one voltage source, such as a battery or an accumulator (chargeable power source), a signal input for accepting an input signal and a signal processing unit. Prior to the digital processing of an analog input signal, it is initially sampled and into a digital signal converter. Conventionally, the sampling rate is selected according to the highest frequency of the input signal that is to be evaluated. The clock frequencies of the digital components, such as A-D converters, D-A converters, signal processing processors or the system clock are also fixed during the manufacture of the medical device. These remain unchanged when the device is operated.

SUMMARY OF THE INVENTION

An object of the present invention is to reduce the energy demand of a self-powered medical device.

This object is achieved in a self-powered medical device that can be operated independently of a power supply network and that has at least one voltage source, a signal input for accepting an input signal and a signal processing unit, wherein in that the sampling rate for the input signal and/or the clock frequency of at least one digital component can be automatically or manually changed.

In a known medical devices, which are operated with a fixed system clock, or with a fixed sampling rate, the energy demand for sampling the input signal and for operating the digital components is almost constant. The entire bandwidth of the input signal, however, often is not of interest and, moreover, the maximally possible processor performance is only partially exhausted. This, however, does not influence the energy demand for operating the medical device. The inventive reduction of the sampling rate for the input signal and/or the clock frequency of a digital component, such as a microprocessor or a digital signal processor, results in an almost proportional reduction of the power draw of the corresponding components. Correspondingly, the operating time of the medical device can be increased with an installed battery or an installed accumulator.

In an embodiment of the invention that can be simply realized, the sampling rate or the clock frequency is altered by manually operating an operating element provided for that purpose. Therefore, the user of the medical device can independently exercise influence on the energy demand of the device.

In another, more comfortable, version of the invention the sampling rate for the input signal and/or the clock frequency of at least one digital component can be automatically controlled by a signal analysis and evaluation unit. For example, when it is recognized that the input signal exhibits only a limited bandwidth, the sampling rate is correspondingly adapted in an independent manner.

Another embodiment of the inventive medical device, has multiple signal inputs for accessing a number of input signals parallel, but an input signal is not present at every signal input, or not all input signals are evaluated. Signal sampling can be completely foregone in this embodiment and the performance of a signal processor for processing the input signals can be correspondingly reduced, whereby by decreasing the clock frequency.

In another embodiment of the invention, the sampling rate for the input signal and/or the clock frequency of at least one digital component are dependent on the state of the voltage source. When a decrease in voltage supply is detected, this component can be automatically or manually switched into a type of "energy saving mode". Although the functionality of the device is reduced, limited operation can be thus maintained for a limited time with a reduced energy demand.

An advantageous embodiment of the inventive medical device is a hearing aid device having at least one voltage source, an input converter for accepting an acoustic input signal, with an output converter and a signal processing unit. Due to the desired miniaturizing, the energy storage capacity of the voltage source is tightly limited in hearing aid devices, in particular. Therefore, a decrease in the energy demand has a particularly advantageous effect on these devices.

Modern hearing aid devices offer the person wearing the hearing device the ability to choose between different hearing programs. These, in turn, are specifically adapted to specific hearing situations. Different hearing situations, however, require respectively different calculating capacity with respect to the signal processing. This requirement is inventively met by employing of a sampling rate and clock frequency that is correspondingly adapted to the requirements of the selected hearing program. The corresponding adaptation ensues manually or automatically by means of selecting the hearing program.

In a further embodiment of the invention the momentary (current) sound situation of the hearing aid device is recognized by a signal analysis and evaluation unit and the sampling rate or the clock frequency is automatically adapted based thereon. An environment wherein voice signals have interfering signals superimposed therein is an example of such a sound situation. For example, when the hearing aid device offers the possibility to process and transmit input signals up to 10 kHz as a maximum, the transmission and processing up to maximally 5 kHz is normally sufficient with respect to voice signals. Therefore, the sampling rate for the input signal and the clock frequency of the digital signal processor or the system clock can be halved. Parasitic signals with a frequency above 5 kHz are no longer transmitted as a result. Moreover, current available filters for the suppression of background noise in the limited frequency range up to 5 kHz can operate more effectively. The system clock can be increased again when a different hearing program is subsequently selected, wherein a larger bandwidth is desired for music, for example. It is also possible to increase the system clock for sound-optimized hearing programs vis-a-vis the normal value.

DESCRIPTION OF THE DRAWING

The single FIGURE is a schematic block diagram of a medical device, in the form of a digital hearing aid, constructed and operating in accordance with the principles of the present invention.

DESCRIPTION OF THE PREFERRED EMBODIMENTS

The FIGURE schematically shows a digital hearing aid device 1 having an acoustic/electrical input transducer 3, an A-D converter 10 for sampling and A-D-converting the analog input signal into a digital signal, a signal processing unit 4 with a digital signal processor 5, a digital-to analog converter 11 and an electrical/acoustic output transducer 9. Further, the hearing aid device 1 has a clock generator 12 with a variable output clock, a signal analysis and evaluation unit 7, as well as an operating element 6 in the form of a key switch. A battery 2 provides the hearing aid device 1 with voltage (power).

A separate clock generator can alternatively be allocated to individual components and can be inventively variable as to its clock frequency; this is different from the represented exemplary embodiment with a clock generator 12, which fixes the clock frequency of the digital components of the hearing aid device 1 (system clock).

Various hearing programs can be selected by means of the key switch 6. These are respectively optimized for different hearing situations. Depending on the selected hearing program, the clock frequency for hearing device components, such as the A-D converter 10, the signal processor 5 or the D-A converter 11, is fixed as well as the sampling rate for the input signal. Another possibility for fixing the clock frequency and the sampling rate is achieved in the exemplary embodiment by means of the signal analysis and evaluation unit 7. The unit 7 analyzes the analog as well as the A-D-converter input signal and recognizes the frequency spectrum of the input signal or the hearing situation of the hearing aid device 1. This evaluation also influences the clock generator 12. Also a detector 8 is provided for monitoring the status of the voltage source 2. When the energy stored therein approaches depletion, the detector 8 reduces the clock frequency and the signal processing is switched into a reduced power operating mode. Thus, a limited operation of the hearing aid device 1 is still possible with the installed battery 2 for a limited period of time.

Although modifications and changes may be suggested by those skilled in the art, it is the intention of the inventors to embody within the patent warranted hereon all changes and modifications as reasonably and properly come within the scope of their contribution to the art.

We claim as our invention:

1. A self-powered hearing aid, operable independently of a power supply network, comprising:

a housing containing at least one voltage source;

an acousto-electric transducer which receives an incoming audio signal and generates an analog input signal therefrom;

an analog-to-digital converter for converting said analog input signal into a digital input signal, including sampling said analog input signal at a sampling rate;

a digital signal processing unit for digitally processing said digital input signal to correct a hearing impairment by executing a hearing program including at least one signal processing procedure having a clock frequency associated therewith, to produce a digital output signal;

a digital-to-analog converter for converting said digital output signal into an analog output signal, said digital-to-analog converter operating at said sampling rate;

a signal analysis and evaluation unit for analyzing said digital input signal and for altering at least one of said sampling rate and said clock frequency dependent on said digital input signal to temporarily reduce at least one of said sampling rate and said clock frequency; and an electroacoustical transducer supplied with said analog output signal for generating an audio output signal therefrom.

2. A hearing aid as claimed in claim 1 wherein said processor is operable according to one of a plurality of selectable hearing programs, and wherein said signal analysis and evaluation unit alters at least one of said sampling rate and said clock frequency dependent on said digital input signal and dependent on the hearing program which is currently selected.

3. A hearing aid as claimed in claim 1 wherein said signal analysis and evaluation unit identifies a sound situation by analyzing said digital input signal, and alters at least one of said sampling rate and said clock frequency dependent on said sound situation.

4. A hearing aid as claimed in claim 3 wherein, if said signal analysis and evaluation unit identifies a sound situation comprising voice signals superimposed with interfering signals, said signal analysis and evaluation unit causes at least one of said sampling rate and said clock frequency to be reduced.

* * * * *